(12) United States Patent
Rickman et al.

(10) Patent No.: US 10,267,694 B2
(45) Date of Patent: Apr. 23, 2019

(54) MICROMETEOROID AND ORBITAL DEBRIS IMPACT DETECTION AND LOCATION USING FIBER OPTIC STRAIN SENSING

(71) Applicant: The United States of America as represented by the Administrator of the National Aeronautics and Space Administration, Washington, DC (US)

(72) Inventors: Steven L. Rickman, League City, TX (US); W. Lance Richards, Palmdale, CA (US); Anthony Piazza, Palmdale, CA (US); Eric L. Christiansen, Houston, TX (US); Francisco Pena, Pasadena, CA (US); Allen R. Parker, Jr., Lancaster, CA (US)

(73) Assignee: THE UNITED STATES OF AMERICA AS REPRESENTED BY THE ADMINISTRATOR OF NASA, Washington, DC (US)

(*) Notice: Subject to any disclaimer, the term of this patent is extended or adjusted under 35 U.S.C. 154(b) by 149 days.

(21) Appl. No.: 15/405,606

(22) Filed: Jan. 13, 2017

(65) Prior Publication Data
US 2017/0205297 A1 Jul. 20, 2017

Related U.S. Application Data

(60) Provisional application No. 62/279,236, filed on Jan. 15, 2016.

(51) Int. Cl.
*G01L 1/24* (2006.01)
*G01L 5/00* (2006.01)
*G01M 11/08* (2006.01)

(52) U.S. Cl.
CPC ............ *G01L 5/0052* (2013.01); *G01L 1/246* (2013.01); *G01M 11/083* (2013.01)

(58) Field of Classification Search
CPC ....... G01L 5/0052; G01L 1/246; G01L 1/245; G01L 1/243; G01L 1/242; G01L 1/24;
(Continued)

(56) References Cited

U.S. PATENT DOCUMENTS 4,781,056 A * 11/1988 Noel ................... G01L 1/243
177/DIG. 6
4,936,649 A * 6/1990 Lymer ................ G01M 5/0091
156/158

(Continued)

OTHER PUBLICATIONS

Stansbery, E. G. et al., "NASA Orbital Debris Engineering Model ORDEM 3.0—User's Guide", Apr. 2014, NASA/TP-2014-217370.
(Continued)

*Primary Examiner* — John R Lee
(74) *Attorney, Agent, or Firm* — Robin W. Edwards; Mark P. Dvorscak

(57) ABSTRACT

Various embodiments may provide a strain-sensing apparatus configured to be attached to a micrometeoroid and orbital debris (MMOD) shielding layer and data collection equipment in communication with the strain-sensing apparatus configured to detect an occurrence, a time, a location, and/or a severity of a MMOD strike on the MMOD shielding layer. The various embodiments may enable detection and/or location of potentially harmful MMOD strikes on both human occupied and unmanned spacecraft.

20 Claims, 6 Drawing Sheets

(58) Field of Classification Search
CPC ....... G01L 1/247; G01M 7/08; G01M 11/083; G01M 11/085; G01M 11/086
See application file for complete search history.

(56) References Cited

U.S. PATENT DOCUMENTS

| | | | | |
|---|---|---|---|---|
| 4,996,419 | A * | 2/1991 | Morey | G01D 5/35383 250/227.18 |
| 5,015,842 | A * | 5/1991 | Fradenburgh | G08B 13/126 250/227.15 |
| 5,380,995 | A * | 1/1995 | Udd | G01D 5/35303 250/227.18 |
| 5,828,059 | A * | 10/1998 | Udd | G01L 1/246 250/227.18 |
| 5,841,131 | A * | 11/1998 | Schroeder | G01D 3/036 250/227.17 |
| 6,559,437 | B1 * | 5/2003 | Pope, Jr. | G01M 11/086 250/227.14 |
| 7,189,959 | B1 * | 3/2007 | Morison | G01L 5/0052 250/227.14 |
| 7,406,219 | B2 * | 7/2008 | Gauthier, Jr. | G01D 5/26 250/227.14 |
| 7,630,591 | B2 * | 12/2009 | Allen | D03D 15/00 250/227.11 |
| 7,805,276 | B1 | 9/2010 | Byers et al. | |
| 8,170,836 | B1 * | 5/2012 | Champaigne | G01M 5/0033 178/18.04 |
| 8,594,882 | B2 * | 11/2013 | Wilke | G07C 5/0816 701/29.1 |
| 9,709,459 | B1 * | 7/2017 | Guthrie | G01M 11/085 |
| 2002/0194928 | A1 * | 12/2002 | Miragliotta | G01L 1/24 73/800 |
| 2004/0178330 | A1 * | 9/2004 | Tarvin | G01L 1/246 250/227.23 |
| 2004/0197050 | A1 * | 10/2004 | Lovseth | G01B 11/16 385/37 |
| 2015/0036968 | A1 * | 2/2015 | LeBlanc | G01L 1/246 385/12 |
| 2015/0346053 | A1 * | 12/2015 | Lally | G01D 5/35358 356/477 |
| 2016/0123715 | A1 * | 5/2016 | Froggatt | G01D 5/35316 356/477 |
| 2017/0205297 | A1 * | 7/2017 | Rickman | G01L 1/246 |

OTHER PUBLICATIONS

NASA Johnson Space Center, "Satellite Collision Leaves Significant Debris Clouds", http://www.orbitaldebris.jsc.nasa.gov/newsletter/pdfs/ODQNv13I2 pdf, Apr. 2009.

Shapira, O. et al., "Implementation of a fiber-optic sensing technology for global structural integrity monitoring of UAVs", Conference Paper, Feb. 2014.

Pei, L. et al., "Study on fiber Bragg grating strain sensing array detecting multi-crack damage of cantilever beam". Proc. of SPIE, 2015, vol. 9656.

Choi, K. et al., "Identification of impact force and location using distributed sensors", AIAA Journal, 1996, pp. 136-142 vol. 34, No. 1.

Di Sante, R., "Fibreoptic sensors for structural health monitoring of aircraft composite structures: recent advances and applications", J. Sensors, 2015, pp. 18666-18713.

Connolly, M. P., "The detection of impact damage in composite pressure vessels using source location acoustic monitoring", Proceedings of the 31st Joint Propulsion Conference and Exhibit, Jul. 1995, San Diego, CA.

Kahl, K. et al., "Damage detection in beam structures using subspace rotation algorithm with strain data", AIAA Journal, 1996, pp. 2609-2614, vol. 34, No. 12.

Shaw, J. K. et al., "Model of transverse plate impact dynamics for design of impact detection methodologies", AIAA Journal, 1995, pp. 1327-1334, vol. 33, No. 7.

Sirkis, J. S. et al., "Development of an impact detection technique using optical fiber sensors", Proc. of SPIE vol. 1994, pp. 158-165, vol. 2191.

Kirikera, G. R. et aL., "Adaptive fiber Bragg grating sensor network for structural health monitoring: applications to impact monitoring", J. Structural Health Monitoring, 2011, pp. 5-16, vol. 10 No. 1.

Sai, Y., et al., "Low velocity impact localization system using FBG array and MVDR beam forming algorithm", J. Photonic Sensors, 2015, pp. 357-363, vol. 5, No. 4.

H. Guo, G. Xiao, N. Mrad, J. Yao, "Fiber optic sensors for structural health monitoring of air platforms", J. Sensors 2011, pp. 3687-3705.

Takeda, S., et al., "Delamination monitoring of laminated composites subjected to low-velocity impact using small-diameter FBG sensors", J Composites Part A: Applied Science and Manufacturing, 2005, pp. 903-908, vol. 36, Issue 7.

Shrestha, P. et al., "Impact localization on composite wing using 1D array FBG sensor and RMS/correlation based reference database algorithm", J. Composite Structures, 2015, pp. 159-169. vol. 125.

Hafizi, Z. M. et al., "Impact location determination on thin laminated composite plates using an NIR-FBG sensor system Measurement", 2015, pp. 51-57, vol. 61.

NASA Johnson Space Center, Hypervelocity Impact Technology Webpage, available at http://ares.jsc.nasa.gov/orbital_debris/hvit/impact, downloaded Jan. 11, 2017.

Christiansen, E. L. "ISS Micrometeoroid & Orbital Debris (MMOD) Impact Damage", Mar. 29, 2016.

Rickman, Steven L. et al. "Micrometeoroid/Orbital Debris (MMOD) Impact Detection and Location Using Fiber Optic Bragg Grating Sensing Technology", 6th Asia Pacific Workshop on Structural Health Monitoring, 6th APWSHM, Dec. 2016.

* cited by examiner

MICROMETEOROID AND ORBITAL DEBRIS IMPACT DETECTION AND LOCATION USING FIBER OPTIC STRAIN SENSING

CROSS REFERENCE TO RELATED APPLICATIONS

This application claims the benefit of priority to U.S. Provisional Application No. 62/279,236 filed on Jan. 15, 2016 titled "Micrometeoroid/Orbital Debris Impact Detection and Location Using Fiber Optic Strain Sensing," the entire contents of which are hereby incorporated by reference in their entirety.

STATEMENT REGARDING FEDERALLY SPONSORED RESEARCH OR DEVELOPMENT

The invention described herein was made by employees of the United States Government and may be manufactured and used by or for the Government for governmental purposes without the payment of any royalties thereon or therefore.

BACKGROUND OF THE INVENTION

Spacecraft in low earth orbit (LEO) experience a variety of hazards including exposure to micrometeoroids and orbital debris (MMOD). Average impact speeds for orbital debris on spacecraft in LEO are 9 to 10 km/s, and 20 km/s for micrometeoroids. Due to their high speeds, MMOD can cause considerable impact damage to sensitive spacecraft surfaces such as windows, structural elements, electronic boxes, solar arrays, radiators, thermal protection system (TPS) materials covering crew/cargo return vehicles, as well as crew modules. Prolonged exposure to the on-orbit MMOD environment can potentially compromise the TPS covering return vehicles such as the future crewed vehicles expected to visit and remain for a half-year or longer at the International Space Station (ISS).

However, determination of MMOD impact on orbiting spacecraft currently requires visual inspection. For human-rated spacecraft (such as the ISS and, previously, the Space Shuttle Orbiter), this has required crew time as well as vehicle assets to identify damage due to MMOD strikes. For unmanned spacecraft, there are no human assets present to conduct detailed surveys to ascertain potential damage.

Orbital debris fragments are generated by on-orbit explosions, collisions, breakups and degradation and is a growing threat as suggested by recent orbital debris models. Two recent events, the Chinese ASAT test in 2007 and Cosmos/Iridium collision in 2009 significantly increased orbital debris for satellites in sun-synchronous orbit. The MMOD threat is real and poses considerable risk to crewed, and un-crewed, orbiting spacecraft.

While the current practice of visual inspection may successfully indicate the location of a debris strike, it does not currently allow precise determination of exactly when the debris strike occurred. It is only possible to determine that a debris strike has occurred between two successive inspection events unless damage to other components can allow inference that a debris strike occurred at a specified time.

The Structural Health Monitoring (SHM) community has experimented with using digital signal processing of acoustic signals with Acoustic Emission/PZT/Piezoelectric sensors to automatically detect MMOD impacts. While such approaches have had some success qualitatively detecting that an impact occurred, current systems cannot quantify the location of a MMOD impact and/or the severity of the MMOD impact.

BRIEF SUMMARY OF THE INVENTION

The various embodiments may provide a strain-sensing apparatus configured to be attached to a micrometeoroid and orbital debris (MMOD) shielding layer and data collection equipment in communication with the strain-sensing apparatus configured to detect an occurrence, a time, a location, and/or a severity of a MMOD strike on the MMOD shielding layer. The various embodiments may enable detection and/or location of potentially harmful MMOD strikes on both human occupied and unmanned spacecraft. Various embodiments may provide a method and apparatus using strain measurements to determine that an MMOD impact has occurred on a spacecraft MMOD shield or structure, when the impact occurred, and where the impact occurred. In various embodiments, the strain measurements may be any type strain measurements, such as direct contact sensing measurement techniques and/or non-contact sensing techniques. Example direct contact sensing techniques may include the use of strain gauges and fiber optic sensors, such as sensors using fiber Bragg grating (FBG) sensing and/or sensors using Rayleigh scattering sensing. Example non-contact sensing techniques may include the use of photogrammetry based strain sensors, Moiré based strain sensors, and laser-speckle strain sensors. In various embodiments, the strain measurements may also include acoustic emission (AE) measurements which may enable the location of the impact to be determined. In various embodiments, the extent of damage may be inferred from the strain response to the impact, which may assist in conducting structural health monitoring (SHM). Some embodiments may provide a method and apparatus using FBG sensing to determine that an MMOD impact has occurred on a spacecraft MMOD shield or structure, when the impact occurred, and where the impact occurred. In some embodiments, the extent of damage may be inferred from the FBG response to the impact, which may assist in conducting SHM.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION OF THE INVENTION

Figure 1:
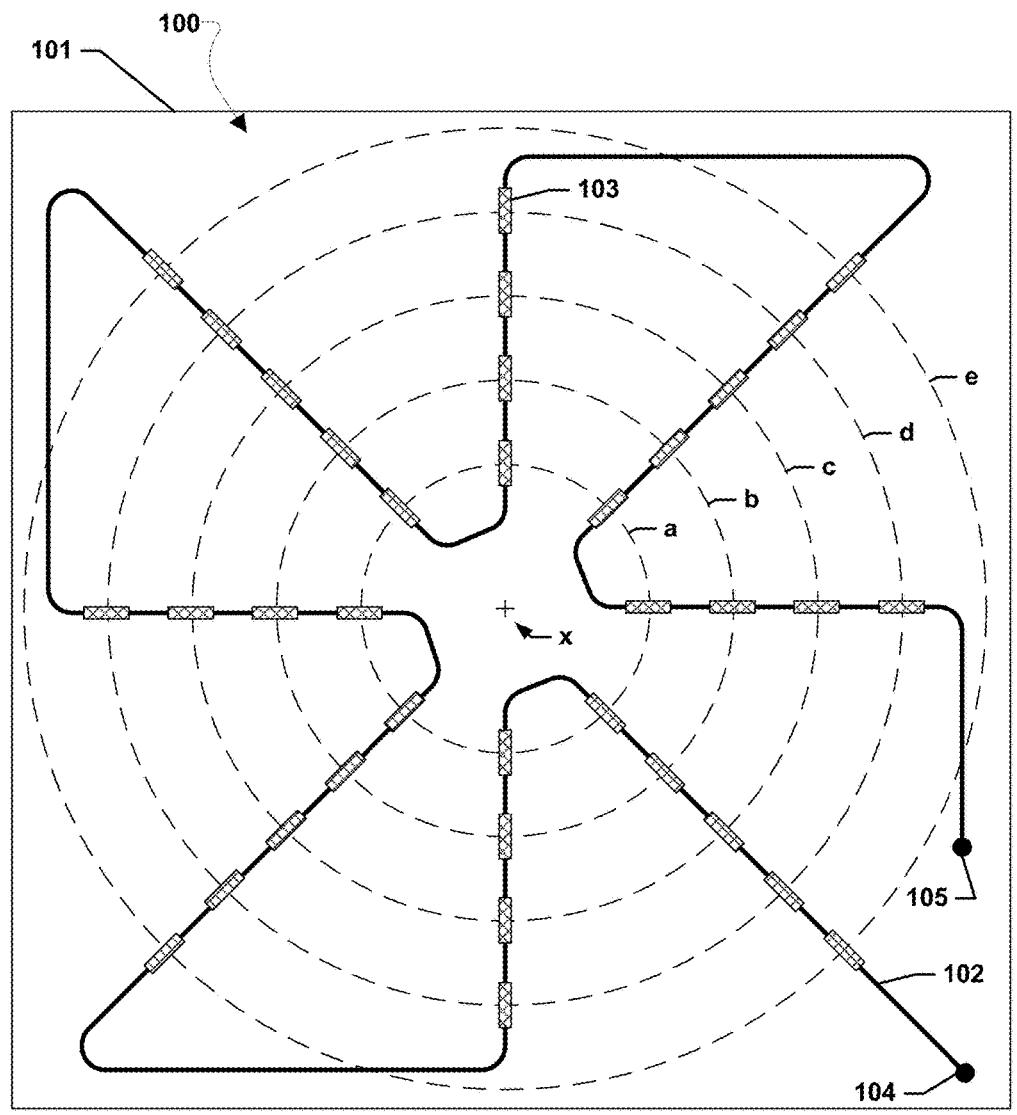
FIG. 1 is a block diagram of a strain-sensing apparatus according to various embodiments.

For purposes of description herein, it is to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The word "exemplary" is used herein to mean "serving as an example, instance, or illustration." Any implementation described herein as "exemplary" is not necessarily to be construed as preferred or advantageous over other implementations.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The various embodiments provide a micrometeoroid and orbital debris (MMOD) shielding which can detect if, when, and where a MMOD strike has occurred on spacecraft shielding or structure. The various embodiments may provide a strain-sensing apparatus configured to be attached to a MMOD shielding layer and data collection equipment in communication with the strain-sensing apparatus configured to detect an occurrence, a time, a location, and/or a severity of a MMOD strike on the MMOD shielding layer. The various embodiments may enable a post-impact strain response of a MMOD shielding layer to be determined and the post-impact strain response to be used to detect an occurrence, a time, a location, and/or a severity of a MMOD strike on the MMOD shielding layer.

In various embodiments, multiple strain sensors, connected into one or more optical fibers may be attached to a MMOD shield or other structural materials. The optical fiber(s) may be connected to a data collection device that may record strain data at a frequency sufficient to resolve MMOD impact events. The strain data may be processed and presented on a computer display. In various embodiments, MMOD impacts may be determined from the time signature of measured strain from multiple sensors on the optical fiber(s). Additionally, for materials that exhibit plastic strain, the time signature of measured strain from multiple sensors on the optical fiber(s) may be used with the strain resulting from plastic strain induced in the MMOD shield and structure as a consequence of the MMOD impact to determine MMOD impacts. Various embodiments may use fiber optic strain sensing to detect MMOD strikes and identify when and where a MMOD strike has occurred along with the severity of the impact. The various embodiments may enable quantification of the severity of a MMOD impact based at least in part on the resulting strain fields detected by the strain sensors.

Various embodiments may provide a method and apparatus using strain measurements to determine that an MMOD impact has occurred on a spacecraft MMOD shield or structure, when the impact occurred, and where the impact occurred. In various embodiments, the strain measurements may be any type strain measurements, such as direct contact sensing measurement techniques and/or non-contact sensing techniques. Example direct contact sensing techniques may include the use of strain gauges and fiber optic sensors, such as sensors using fiber Bragg grating (FBG) sensing and/or sensors using Rayleigh scattering sensing. Example non-contact sensing techniques may include the use of photogrammetry based strain sensors, Moiré based strain sensors, and laser-speckle strain sensors. In various embodiments, the strain measurements may also include acoustic emission (AE) measurements which may enable the location of the impact to be determined. In various embodiments, the extent of damage may be inferred from the strain response to the impact.

Some embodiments may provide a method and apparatus using FBG sensing to determine that an MMOD impact has occurred on a spacecraft MMOD shield or structure, when the impact occurred, and where the impact occurred. In some embodiments, the extent of damage may be inferred from the FBG response to the impact.

The various embodiments may enable detection and location of MMOD strikes on human occupied spacecraft, such as those that might spend considerable time exposed to the MMOD environment in the ISS orbit and may reduce or alleviate the need for other inspection assets on such spacecraft. The various embodiments may enable detection and location of MMOD strikes on unmanned spacecraft that do not possess self-inspection assets. The various embodiments may be useful on spacecraft where identification of MMOD impacts, or other impacts, may be key to understanding the health of the spacecraft and/or its subsystems, and the various embodiments may be applicable to a wide variety of government, commercial, and military spacecraft.

FIG. 1 is a block diagram of a strain-sensing apparatus 100 according to various embodiments. The strain-sensing apparatus 100 may be attached in various manners to a surface 101 of a structure over which impacts are to be monitored, such as a spacecraft surface (e.g., a MMOD shield layer). The surface 101 is illustrated as a simple square in FIG. 1, however the surface 101 may have any shape or size and the square portion of the surface 101 is shown merely for illustrative purposes. The strain-sensing apparatus 100 may include one or more fiber optic strands 102 connecting an array of strain sensors 103. The one or more fiber optic strands 102 may connect the array of strain sensors 103 in series such that light from one or more connection terminals 104 and 105 of the one or more fiber optic strands 102 may pass through the one or more fiber optic strands 102 and array of strain sensors 103 and back out the connection terminals 104 and 105. While two connection terminals 104 and 105 are shown in FIG. 1, only a single connection terminal 104 or 105 may be needed, and one of the connection terminals 104 or 105 may not be present. A single connection terminal 104 or 105 may enable light to pass through the one or more fiber optic strands 102. The optional use of two connection terminals 104 and 105 may enable the one or more fiber optic strands 102 to receive light from both ends. In the event of a break in the one or more fiber optic strands 102, the array of strain sensors 103 may continue to receive light provide from both ends toward the break, thereby enabling sensor interrogation to continue. The one or more fiber optic strands 102 may be used to provide optimal coverage of the area over which impacts are to be monitored and/or to ensure a sufficient number of strain measurements are provided to accurately characterize the nature of an impact. The array of strain sensors 103 may be oriented such that the array of strain sensors 103 are configured to measure a strain gradient across an area of a structure over which impacts are to be monitored.

In various embodiments, the individual strain sensors 103 of the array of strain sensors 103 may be arranged to form rings of strain sensors 103 aligned along rings of different radii from a center x of the strain-sensing apparatus 100, such as rings a, b, c, d, and e. In various embodiments, the number and orientation of the array of strain sensors 103 may be selected based on the type and capability of the individual strain sensors 103, the size of the area over which impacts are to be monitored, and an expected strain gradient across the area over which impacts are to be monitored. In various embodiments, the one or more fiber optic strands 102 connecting the array of strain sensors 103 may be attached to its own sensor plate that may be attached to a spacecraft surface, such as surface 101. For example, the sensor plate may be a sheet of metal (e.g., aluminum, steel, etc.), or any other type material to which the one or more fiber optic strands 102 connecting the array of strain sensors 103 may be attached and that may be attached to a spacecraft surface, such as surface 101.

As another example, the sensor plate may be a sheet of graphite-epoxy, or a graphite-fiber in a flexible/plastic matrix, with the graphite fibers running orthogonal to the general direction of the strain sensors 103. As another example, sensor plate may be a sheet of glass fiber. As another example, the sensor plate may be a woven hybrid fabric, in which the bulk material may be a woven carbon-fiber, or woven glass-fiber fabric, and the one or more fiber optic strands 102 connecting the array of strain sensors 103 may be woven in periodic locations into the weave. One such hybrid fabric may be a plain/square weave carbon or glass fabric with the one or more fiber optic strands 102 connecting the array of strain sensors 103 included into the weave approximately every inch. When the sensor plate is a woven hybrid fabric, the fabric may be rigidized to the extent desired by including an appropriate polymer matrix with the hybrid fabric, such as epoxy for a stiffer matrix, and some other plastic such as polyimide or polypropylene if more flexibility is desired. In other embodiments, the one or more fiber optic strands 102 connecting the array of strain sensors 103 may be attached directly to a spacecraft surface, such as surface 101.

The array of strain sensors 103 may be any type strain sensors, such as FBG strain sensors. The array of strain sensors 103 may be direct contact sensing strain sensors (e.g., strain gauges, fiber optic sensors, etc.) and/or non-contact sensing strain sensors (e.g., photogrammetry based strain sensors, Moiré based strain sensors, and laser-speckle strain sensors, etc.). In various embodiments, the array of strain sensors 103 may be configured to provide AE measurements.

When the array of strain sensors 103 are FBG strain sensors, each of the array of strain sensors 103 may be aligned towards the center x of the area over which impacts are to be monitored as FBG strain sensors may only be sensitive to strain along their primary axis. When the array of strain sensors 103 are FBG strain sensors, the sensors may operate from a 1520 nm to 1570 nm wavelength range.

The number of the array of strain sensors 103 may be any number of strain sensors 103, such as 1-36 strain sensors 103, 36 strain sensors, greater than 36 strain sensors, etc. The array of strain sensors 103 may be interrogated using multiplexing, such as wavelength division multiplexed (WDM). The array of strain sensors 103 may be interrogated using optical frequency domain reflectometry. The physical location and relative position of each of the strain sensors 103 may be recorded to generate a sensor map for the strain-sensing apparatus 100. In a specific embodiment, the array of strain sensors 103 may be 36 FBG strain sensors 8 groups of four to five sensors each equally spaced in 8 lines extending out from the center x of the area over which impacts are to be monitored as illustrated in FIG. 1. However, in other embodiments, the array of strain sensors 103 may be arranged in different patterns and may include different types and numbers of strain sensors 103.

In various embodiments, additional sensors, such as additional FBG sensors may also be used with the array of strain sensors 103 for full field temperature measurement and additional fiber may be used in conjunction with the MMOD sensing to provide a multifunctional shield sensing system allowing detection and location of MMOD impacts, as well as temperature measurement over the area over which impacts are to be monitored. When embedded in multi-layer insulation, the addition of the temperature measurement capability may also allow for multi-layer insulation (MLI) performance (e.g., heat leak) characterization.

Figure 2:
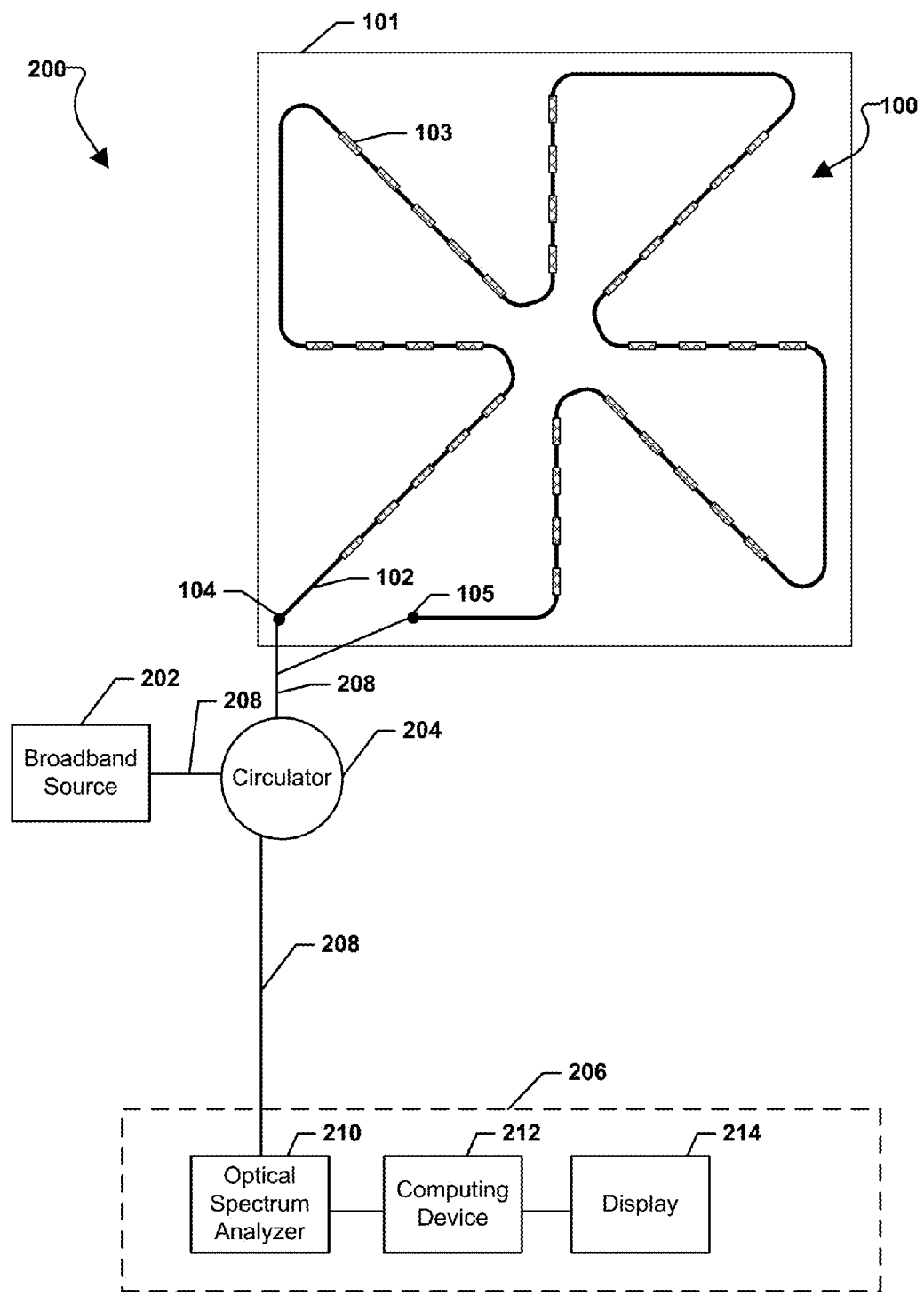
FIG. 2 is a block diagram of a MMOD strike detection system according to various embodiments.

FIG. 2 illustrates a MMOD strike detection system 200 according to various embodiments. The MMOD strike detection system 200 may include one or more strain-sensing apparatuses 100 as described above with reference to FIG. 1. The MMOD strike detection system 200 may include a broadband source 202 connected to a circulator 204 connected to the strain sensing apparatus 100 and a data acquisition system 206. While illustrated as including a circulator 204, the circulator 204 may be replaced in the system 200 with any other device configured to route light from/to the broadband source 202, the strain sensing apparatus 100, and the data acquisition system 206, such as an optical fiber coupler. Thus, the circulator 204 is only one example of a light routing device, and the circulator 204 may be substituted with any type light routing device in the various embodiments. The broadband source 202, circulator 204, and data acquisition system 206 may be connected by one or more fiber optic cables 208. The fiber optic cables 208 from the circulator 204 may connect to the connection terminals 104 and 105 of the stain-sensing apparatus 100. As discussed above, the configuration with two connection terminals 104 and 105 is optional, and only one connection terminal 104 or 105 may be connected to fiber optic cable 208. The use of two connections may enable continued interrogation of the array of strain sensors 103 following a break.

The broadband source 202 may be any type light source configured to provide wavelengths of light over a range suitable for use with the array of strain sensors 103, such as a 10 mW wide-band laser nominally operating at 1550 nm over an 80 nm range. The circulator 204 may be any type optical circulator configured to circulate light between the broadband source 202, stain-sensing apparatus 100, and the data acquisition system 206. For example, the circulator 204 may be a 3-port device hosting a flattened broadband wavelength range of operation at 1550 nm allowing light to travel in only one direction. As a three-way port device, the circulator 204 may be configured to allow light from the broadband source 202 to enter port 1 and exit port 2 with minimal loss, while concurrently allowing the reflected light from the strain sensors 103 of the stain-sensing apparatus 100 to enter port 2 and exit port 3 with minimal loss. This configuration may allow for optimum power utilization of the broadband source 202. The reflected light may be sent to an optical spectrum analyzer (OSA) of the data acquisition system 206 that may sample the reflected light. The OSA 210 may operate in an optical range suitable for use with the array of strain sensors 103 and may be capable of monitoring the array of strain sensors 103 simultaneously at various rates. As one example, the OSA 210 may operate over an 80 nm optical range centered at 1550 nm and may be capable of monitoring 36 optical FBG strain sensors simultaneously at rates up to 5 KHz. The OSA 210 may be connected to a computing device 212 including a processor configured to execute processor-executable instructions, and the computing device 212 may be connected to a display 214. The computing device 212 may be configured with processor-executable instructions to process, record, and/or display the data from the OSA 210. In various embodiments, the computing device 212 and/or display 214 may be dedicated devices operating as part of the data acquisition system 206. In other embodiments, the computing device 212 and/or display 214 may be other computing devices and/or displays of a spacecraft performing other operations in addition to MMOD impact detection.

In operation, an MMOD impact imparts a transient shock loading to a structure which is manifested as transient strain as the shock wave moves through the structure. The array of strain sensors 103 may record time varying strain to identify that a strike has occurred and at what time it occurred. For shields/structures that exhibit plastic strain, minute yet measurable amount of plastic strain remaining in the shield/structure as detected by the multitude of strain sensors 103 after the impact can be used to ascertain the region in which the strike has occurred. Additionally, strike location information can be inferred from the transient strain signals recorded by the multitude of strain sensors 103 in the one or more fiber optic strands 102. The signals recorded may be used to indicate that a MMOD strike occurred, when the MMOD strike occurred, and/or where the MMOD strike occurred on the area over which impacts are to be monitored, such as in a display of MMOD strike information. In various embodiments, calibration techniques and/or learning algorithms may be applied to the signals recorded to quantify the severity of the damage caused by the MMOD strike. In various embodiments, following an impact, the post-impact strain response caused by the damage may be analyzed to detect that damage occurred and the time at which the damage occurred. Numerical processing may then be used in conjunction with the strain field measured by the distributed array of sensors 103 to determine the location of the damage event.

While illustrated in FIG. 2 as a single strain-sensing apparatus 100 of FIG. 1 included in the MMOD strike detection system 200, MMOD strike detection systems of the various embodiments may include multiple strain-sensing apparatuses. For example, grids of multiple strain-sensing apparatuses may be attached to surfaces of a spacecraft to detect MMOD strikes on the spacecraft wherever the strikes may occur.

Figure 3:
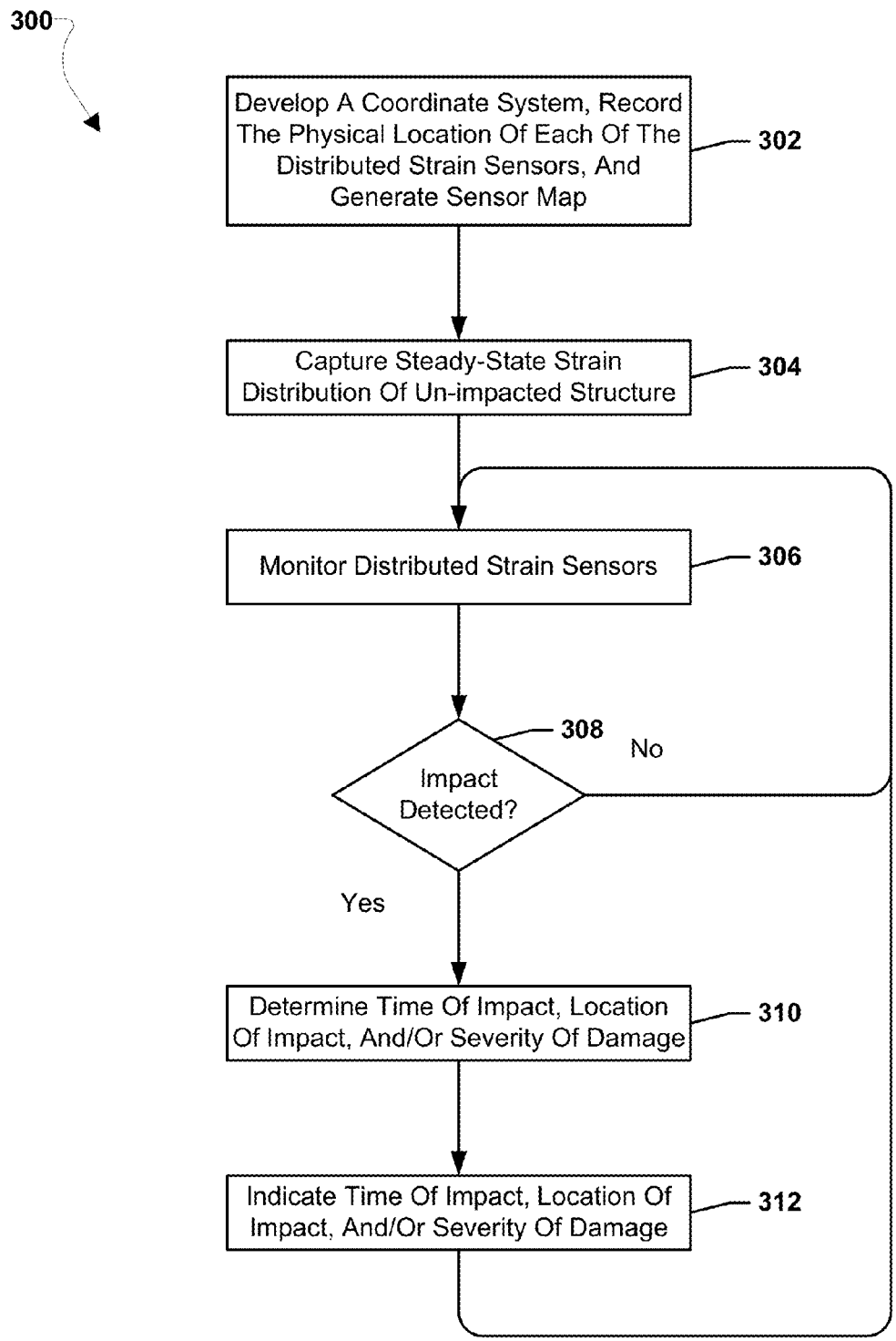
FIG. 3 is a process flow diagram illustrating an embodiment method for MMOD impact detection and characterization.

FIG. 3 is a process flow diagram illustrating an embodiment method 300 for MMOD impact detection and characterization. In various embodiments, the operations of method 300 may be performed by a MMOD strike detection system, such as system 200 described above with reference to FIG. 2. Method 300 may be performed after the strain-sensing apparatus, such as strain-sensing apparatus 100, of the MMOD strike detection system is attached to the area of a structure over which impacts are to be monitored, such as a surface of a spacecraft.

In block 302 a coordinate system for the area of the structure over which impacts are to be monitored may be developed, the physical location of reach of the distributed strain sensors may be recorded, and a sensor map may be generated. As an example, a graphical display of the sensor layout may be generated with a color map to indicate the strain intensity at each of the distributed strain sensors, such as strain sensors 103. As other examples, an x-y scatter plot, surface plot, line plot, and/or stem plot of the of the area over which impacts are to be monitored and the sensors may be generated.

In block 304 a processor of the MMOD strike detection system, such as a processor of computing device 212, may control the broadband source, such as broadband source 202, strain-sensing apparatus, such as strain-sensing apparatus 100, and the OSA, such as OSA 210, to capture a steady-state strain distribution of the un-impacted structure (i.e., the pre-impact strain distribution). This may enable the "healthy" state of the structure to be characterized and stored for use in later comparisons after impacts on the structure. The steady-state strain distribution of the un-impacted structure may be stored in a memory available to the processor.

In block 306 the system may be deployed and the distributed strain sensors may be monitored. For example, a time history for each strain sensor or the strain-sensing apparatus, such as strain-sensing apparatus 100, may be recorded in a memory and the processor of the MMOD strike detection system may monitor the time rate of change of each strain sensor.

In determination block 308 the system may determine whether an impact is detected. A trigger monitoring system may be implemented by the processor of the MMOD strike detection system monitoring for strain rates above a pre-determined threshold (e.g., strain rates may be compared to strain rate thresholds representing a minimum threshold for triggering an impact). During an impact, the strain measurements around the impact zone may oscillate ("ring") at a high frequency. When strain rates rise above the pre-determined threshold, an impact may be detected.

In response to determining an impact is not detected (i.e., determination block 308="No"), the system may continue to monitor the sensors in block 306.

In response to determining an impact is detected (i.e., determination block 308="Yes"), in block 310 the processor of the MMOD strike detection system, such as the processor of computing device 212, may determine a time of the impact, location of the impact, and/or a severity of the damage caused by the impact. In this manner, the data acquisition system may determine a time of an impact, a location of the impact, and/or a severity of damage of the impact on the area of the structure to be monitored based on strain rates of the array of strain sensors.

The time ($t_{trigger}$) at which the trigger occurred (i.e., the pre-determined threshold was exceeded) may be recorded as the time of the impact. If a more accurate indication of time of impact is desired and if apriori acoustic properties are known (i.e., the lamb wave propagation velocity), the trigger time for the strain sensor closest to the impact and the location of the impact may be used to calculate the delay time for which the impact actually occurred. Lamb wave velocity ($V_{lamb}$) multiplied by distance (d) from impact may be the time delay ($t_{delay}$) that occurred between the time of impact event ($t_{event}$) to the time the first sensor detected the event ($t_{trigger}$), e.g., $t_{delay} = V_{lamb} * d \rightarrow t_{event} = t_{trigger} - t_{delay}$.

Changes to the strain field may indicate the severity of the damage caused by the impact. The event trigger may be used to save a recording of the strain distribution time history starting at a time prior to the event and lasting until the oscillation dissipates. A post-impact strain field may be found by comparing the strain state prior to the event trigger and strain state after the oscillations dissipate. The post-impact strain distribution may have higher strain readings radiating radially from the impact location.

The location of the impact may be found using post-impact strain distribution to identify at least three sensors with the highest magnitude of strain, which are then stored in a subgroup. Using the physical location of each sensor within the subgroup and its corresponding strain response, the impact location may be found by either performing a center of mass calculation, or by utilizing the trilateration method. To perform a center of mass calculation, replace mass with strain magnitude. A center of strain calculation as follows may determine the point of impact as ($X_{sc}$, $Y_{sc}$) such that:

$$X_{SC} = \frac{1}{\sum_{i=0}^{n} \varepsilon_i} \sum_{i=0}^{n} \varepsilon_i x_i \text{ and } Y_{SC} = \frac{1}{\sum_{i=0}^{n} \varepsilon} \sum_{i=0}^{n} \varepsilon_i y_i,$$

Where $X_{SC}$ is the x-coordinate of the center of strain, $Y_{sc}$ is the y-coordinate of the center of strain, n is the number of sensors reporting strain, ε is the magnitude of strain, $x_i$ is the x-coordinate of sensor i, $y_i$ is the y-coordinate of sensor i, and $\varepsilon_i$ is the magnitude of strain of sensor i. To utilize the trilateration method, the sensors may be ranked within the subgroup from highest to lowest strain and the physical X-Y location for each of the sensors may be tracked. From the source of the impact, the strain magnitudes decay radially from the source of impact. The following equations may then used to determine the impact location:

$$r_1 = r_1$$
$$r_2 = \frac{\varepsilon_1}{\varepsilon_2} \cdot r_1$$
$$r_3 = \frac{\varepsilon_1}{\varepsilon_3} \cdot r_1$$
$$r_1^2 = x^2 + y^2$$
$$r_2^2 = (x - d)^2 + y^2$$
$$r_3^2 = (x - i)^2 + (y - j)^2$$

where there are five unknown variables to solve for: $r_1$, $r_2$, $r_3$, x, and y. Variable d may be the distance vector from the 1st ranked sensor to the 2nd ranked sensor. A coordinate rotation transformation is required such that vector d will align to the horizontal-axis. Variable i may be the horizontal-axis vector from the 1st ranked sensor to the 3rd ranked sensor. Variable j may be the vertical-axis vector from the 1st ranked sensor to the 3rd ranked sensor. Variables x and y may be the location of impact within the coordinate rotation transform. $\varepsilon_1$, $\varepsilon_2$, and $\varepsilon_3$ may be the magnitude of strain the magnitudes of strain at the three sensors, respectively, and $r_1$, $r_2$, $r_3$ may be the distances from the three strain sensors to the point of impact, respectively. The inverse coordinate rotation transform may be required to solve for the x and y locations in the global coordinate system.

In block 312 the system may indicate the time of impact, location of the impact, and/or a severity of the damage caused by the impact. For example, the time of impact, location of the impact, and/or a severity of the damage caused by the impact may be output on a display, such as display 214. The post-impact strain response from multiple impacts may also be collected and superimposed on the initial "healthy" state of the system to determine the accumulated damage throughout the operational life of the structure.

Tests according to the various embodiments of a MMOD strike detection system were carried out to accurately and reliably ascertain the following from hypervelocity MMOD impacts: 1) that an actual damage event has occurred to a representative structure, 2) the time at which damage event occurred, 3) its location, and 4) to provide a practical method to quantify the severity of the damage event in which inspection and remediation plans can be developed.

In accordance with the various embodiments, a highly-multiplexed distributed array of FBG strain sensors, such as an array described above with reference to FIG. 1, was bonded to the surface of a representative test article and the in-plane strain fields were measured. The test article was then impacted with a realistically-simulated MMOD projectile traveling at hypervelocity speeds. Following the impact, the post-impact strains caused by the damage were analyzed to detect that damage occurred and the time at which damage occurred. Numerical processing was then used in conjunction with the strain responses measured by the distributed array of FBGs to determine the location of the damage event.

An embodiment proof-of-concept system was tested by NASA's Hypervelocity Impact Technology (HVIT) group using a two-stage light-gas launcher at the White Sands Test Facility (WSTF). A 1.6 mm thick aluminum 2024-T3 Al-clad plate measuring 38 cm 38 cm with a test section measuring 30.5 cm×30.5 cm, representative of a MMOD shield outer layer or spacecraft structure, was mounted in a frame and instrumented with an optical fiber with 36 strain sensors. The test article configuration was similar to that discussed above with reference to FIG. 1. The article was tested in the 4.3 mm caliber range with spherical aluminum 2017-T4 projectiles. The test setup in the impact lab included sensor monitoring equipment and data display that indicated impact location in near real-time. Strain sensor signals were recorded by the data acquisition system at 5 kHz sampling rate.

Given the size of the test article target area (30.5 cm×30.5 cm), and a sensor density of 1 Bragg grating per 0.3937 cm (i.e., 1 inch) of sensing fiber, it was determined that the best coverage over the test article area was achieved with 36 Bragg gratings, with the primary axis of the Bragg gratings aligned towards the center of the test article. The physical location of each fiber Bragg grating was recorded, and was used to develop a sensor map. The FBG data acquisition system used for the test application was designed to interrogate and record data from a single fiber with 36 WDM sensors installed on the test article utilizing just a few components. The test system was arranged similar to the MMOD strike detection system 200 described above with reference to FIG. 2. All components were commercially available with exception to the sensing fiber, which was custom ordered for this test application. The broadband light source was a 10 mW wide-band laser nominally operating at 1550 nm over an 80 nm range. The optical fiber circulator was a 3-port device hosting a flattened broadband wavelength range of operation at 1550 nm allowing light to travel in only one direction. The three-way port device allowed light from the broadband source to enter port 1 and exit port 2 with minimal loss, while concurrently allowing the reflected light from the sensors to enter port 2 and exit port 3 with minimal loss. This configuration allowed for optimum power utilization of the broadband source. The reflected light was then sampled by an OSA. The OSA operated over an 80 nm optical range centered at 1550 nm. The OSA was attached via a Universal Serial Bus (USB) interface to a standard laptop for data processing, display and recording. The test system was capable of sensing up to 36 FBGs simultaneously at a rate of 5 KHz. Each sensor was limited to a +/−1 nm range which translated to approximately +/−800με. Sensor data from the 36 FBGs was continuously recorded during each test and post processed.

Figure 4:
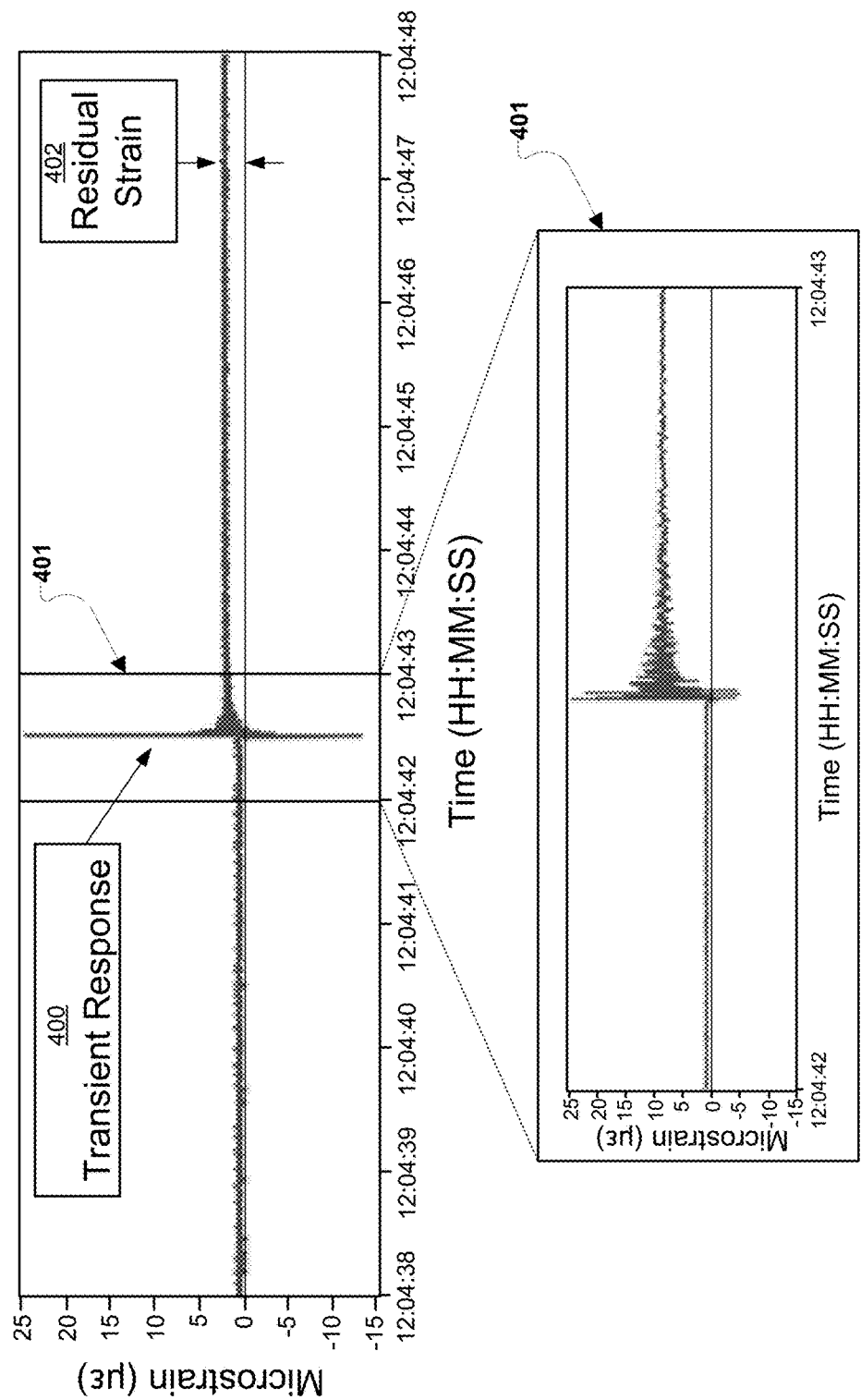
FIG. 4 is an example time history graph of an individual FBG according to various embodiments.

The test article was installed in a test chamber at the HVIF and data from six hypervelocity shots were acquired using the 4.3 mm caliber range. Table 1 summarizes the test matrix used in the test program, which included a variety of projectile sizes and incidence angles for various target locations on the test article.

each measurement, it was then detected that an event occurred and the approximate time the event occurred. An example of the time history of an individual (i.e., 1 of 36) fiber Bragg grating measurement during Test Sequence 3 is shown in FIG. 4. FIG. 4 is an example time history graph of an individual FBG according to various embodiments. FIG. 4 shows the transient response 400 at the time of impact and the strain response 402 after impact. A portion 401 of the time history graph is shown enlarged to better illustrate the characteristics of the transient response 400. The max strains measured by the FBG for all load sequences are listed in

TABLE 1

| Test Sequence | Impact Location | Projectile Diameter (mm) | Projectile Mass (g) | Projectile Velocity (km/s) | Impact Angle (deg) | Description of Target Damage, Damage Diameter |
|---|---|---|---|---|---|---|
| 1 | 6 | 0.30 | 0.00004 | 6.85 | 0 | Crater, 1.5 mm |
| 2 | 1 | 1.0 | 0.00143 | 7.10 | 0 | Hole, 3.4 mm |
| 3 | 2 | 0.5 | 0.00017 | 6.98 | 0 | Hole, 0.5 mm |
| 4 | 4 | 1.0 | 0.00148 | 7.00 | 45 | Hole, 3.1 × 2.9 mm |
| 5 | 5 | 0.5 | 0.00019 | 6.98 | 45 | Crater, 2.4 × 2.3 mm |
| 6 | 6 | 1.0 | 0.00147 | 6.98 | 0 | Hole, 3.4 mm |

Prior to deployment of the test article, the steady-state spectral distribution/strain distribution was captured and used as a reference state of the structure. The test article was then deployed into operation and continuously monitored during testing. A short time history for each Bragg grating was buffered in temporary memory and the time rate of change of each strain measurement was tracked. An event triggering system was activated by monitoring threshold on high strain rates in order to find the time of an impact.

The first two test objectives of the tests were to detect if an impact event had occurred, and if so at what time did the event occur. To detect an impact event, the time rate of change of each strain measurement was tracked. To trigger the event indicator, both the time rate of change of the strain and measured max strain value needed to exceed a threshold. Prior to test, the noise of the system was estimated to produce a measurement uncertainty of approximately −2 to +2με peak-to-peak. In all six of the test sequences, the max strain detected by the FBG was well above 10με and therefore statistically outside of the noise band. Utilizing both the event trigger and the time stamp associated with Table 2. It is also noted that the peak strain experienced by the test article is anticipated to have been at a much higher magnitude than the FBG was able to detect; this is due to the limited number of sensors and the limited sample rate of the FBG used during the tests.

TABLE 2

| Test Sequence | Max Strain Detected (με) | Max Post-Impact Strain (με) | Actual Impact Location | | Estimated Difference Location | | Strain Based Total Distance (cm) |
|---|---|---|---|---|---|---|---|
| | | | x (cm) | y (cm) | x (cm) | y (cm) | |
| 1 | 18 | 1 | 0.3 | 0.2 | −3.3 | 8.1 | 8.7 |
| 2 | 48 | 10 | 5.4 | 11.9 | 5.0 | 12.2 | 0.5 |
| 3 | 34 | 12 | −9.3 | 3.6 | −10.1 | 3.9 | 0.9 |
| 4 | 58 | 12 | −5.0 | −10.8 | −4.8 | −10.7 | 0.3 |
| 5 | 46 | 14 | 10.8 | −1.8 | 10.2 | −3.1 | 1.4 |
| 6 | 58 | 7 | 0.5 | 0.6 | 0.6 | 0.6 | 0.1 |

After detecting that an impact event has occurred, the next objective was to utilize the strain measurements to estimate the location of the impact, and the severity of the damage. The post-impact strain field was used to estimate the damage caused by the simulated MMOD the impact. The post-impact strain field is found by using the system event trigger to save a recording of the strain distribution time history starting several seconds before the impact event, and lasting until the post-impact oscillations dissipate. The difference between the two states is used as the post-impact strain response. The changes in the strain field indicates that the structure has accumulated some level of damage.

The results of the impact location estimation algorithm are presented in Table 2. The impact location estimation for Test Sequence 1 indicated the largest difference between the actual location and the estimated location, which was due to absence of a meaningful strain response above the noise band. Test Sequence 1 utilized a projectile with the smallest mass (0.00004 g) and the smallest projectile diameter (0.3 mm) of all the test sequences. Test Sequence 2 through Test Sequence 6 each had a max post-impact strain above the 2µε noise floor, and therefore resulted in a suitable signal for the strain based impact location estimation algorithm. The impact location estimation algorithm was within 1.5 cm for the remaining Test Sequences 2 through 6, and approximated the impact location as close as 0.1 cm.

Figure 5A:
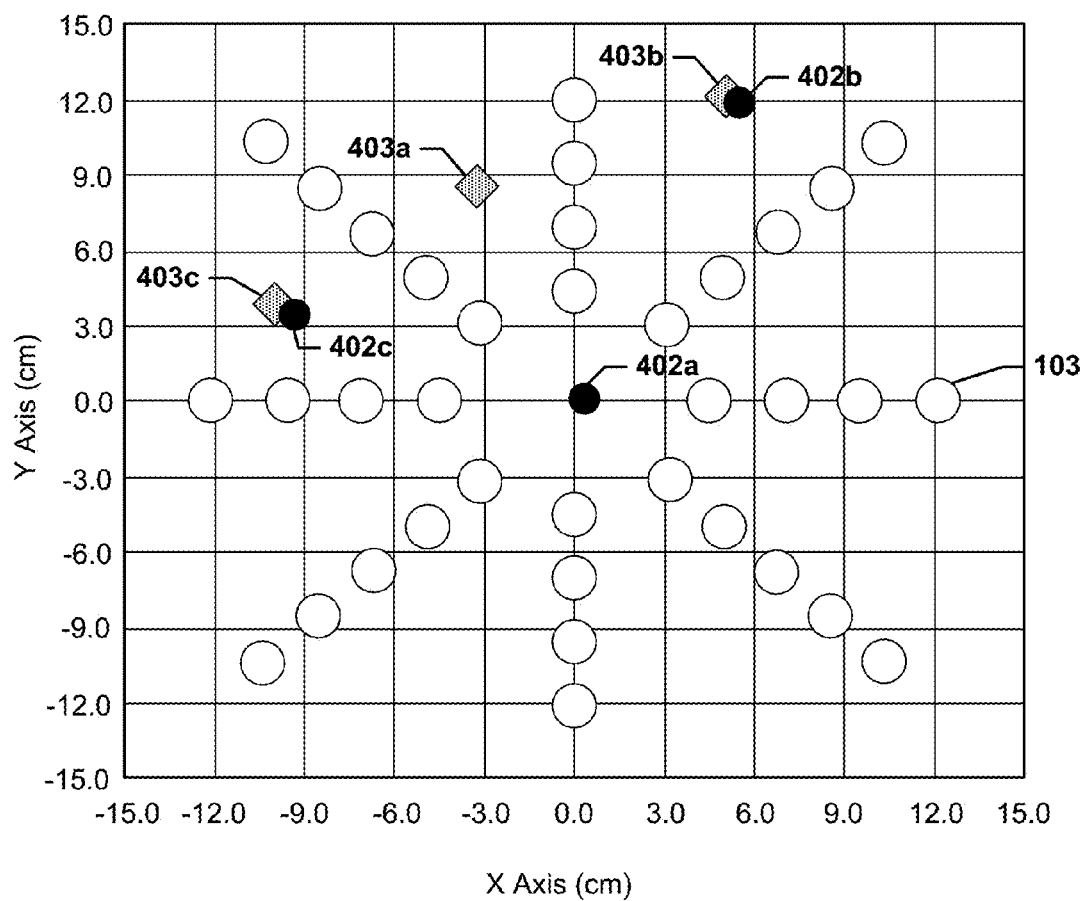
FIGS. 5A and 5B are diagrams of actual impact locations and estimated impact locations of test measurements performed with an embodiment MMOD strike detection system.
Figure 5B:
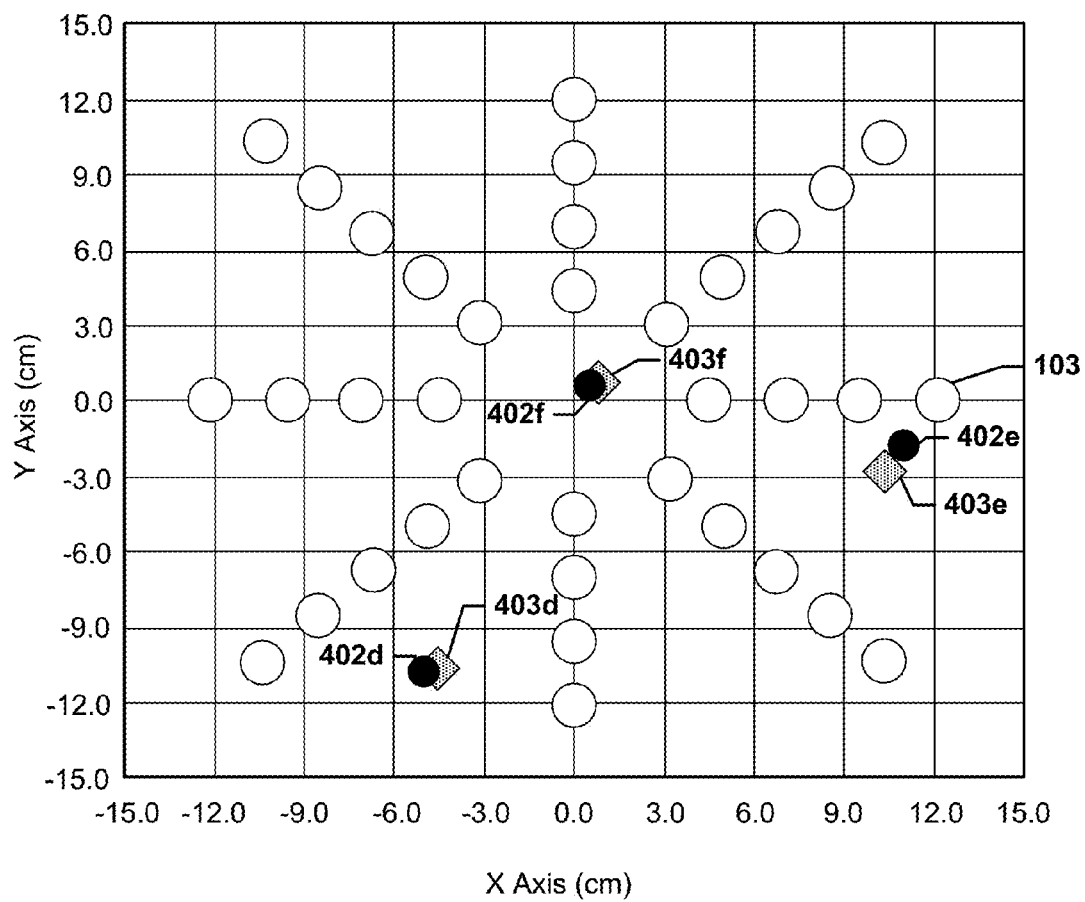

FIGS. 5A and 5B are diagrams of actual impact locations and estimated impact locations of the Test Sequences 1-6. Changes in the strain field also enabled the development of an automated strain based impact location estimation algorithm. The impact location was found by utilizing the post-impact strain distribution to identify at least three (minimum) sensing stations with the highest strain magnitude, which were then stored in a subgroup. The strain magnitudes and physical locations (i.e., x,y coordinates) of the sensor subgroup were then be used with a series of algebraic equations to determine the impact location (x,y). The results from the automated impact location estimation algorithm are presented in FIGS. 5A and 5B as estimated locations $403a$, $403b$, $403c$, $403d$, $403e$, and $403f$ corresponding to actual Test Sequence 1-6 impact locations $402a$, $402b$, $402c$, $402d$, $402e$, and $402f$.

While discussed above in relation to impact detection of MMOD impacts for spacecraft, the various embodiments may be applied to impact detection and characterization for any application, such as impact detection and characterization in the automobile industry, unmanned aerial vehicles (UAVs), the fuel storage industry, wind turbines, pipeline systems, sports medicine and medical research, etc. For example, the various embodiments may be used to monitor for impacts on surfaces in automobile lightweight fuel tanks, such as those used in hydrogen fuel cell technology, or automobile body features (e.g., spoilers, etc.). As another example, the various embodiments may be used to monitor for impacts on surfaces in any industry that uses lightweight high pressure tanks, especially in environments that are difficult to inspect. As a further example, the various embodiments may be integrated into manned or unmanned aircraft and/or spacecraft lighting strike detection systems, damage (e.g., battle, collision, vehicle, etc.) assessment systems. As another example, the various embodiments may be used for body armor monitoring. As yet another example, the various embodiments may be used for wind turbine damage detection. As still another example, the various embodiments may be used for pipeline health monitoring. As further example, the various embodiments may be used in sports medicine or medical research to provide concussion detection and diagnosis (e.g., by integration onto helmet surfaces). Thus, the various embodiments may be useful to any industry in which surface impact detection and characterization is of importance.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A strike detection system for detecting a collision between a vehicle and a fragment, the strike detection system comprising:
    a strain-sensing apparatus configured to attach to the vehicle, the strain-sensing apparatus comprising an array of strain sensors connected via one or more optical fibers and configured to measure a strain gradient over an area of a structure of the vehicle caused by a transient shock load of the fragment; and
    a data acquisition system connected to the strain-sensing apparatus, wherein the data acquisition system is configured to determine a time of an impact, a location of the impact, and a severity of damage of the impact of the fragment on the area of the structure based, at least in part, on a trilateration of post-impact residual strain rates of the strain gradient in the structure as measured by the array of strain sensors.

2. The system of claim 1, further comprising one or more connection terminals configured to pass light into the one or more optical fibers, wherein the one or more optical fibers connect the array of strain sensors in series such that light from the one or more connection terminals pass through the one or more fiber optic strands and the array of strain sensors.

3. The system of claim 1, wherein the array of strain sensors includes non-contact strain sensors, and wherein the non-contact strain sensors are photogrammetry strain sensors, Moiré strain sensors, and/or laser speckle strain sensors.

4. The system of claim 2, wherein the one or more connection terminals include: a first connection terminal in direct contact with and configured to pass light into a first end of the one or more optical fibers, and a second connection terminal in direct contact with and configured to pass light into a second end of the one or more optical fibers.

5. The system of claim 4, wherein the array of strain sensors includes direct contact strain sensors, and wherein the direct contact strain sensors are fiber optic sensors.

6. The system of claim 5, wherein the fiber optic sensors are Rayleigh scattering strain sensors and/or fiber Bragg grating (FBG) strain sensors.

7. The system of claim 1, wherein the strain sensors are arranged to form rings of strain sensors aligned along rings of different radii from a center of the strain-sensing apparatus.

8. The system of claim 1, wherein the strain-sensing apparatus is configured to use wavelength division multiplexing or optical frequency domain reflectometry to interrogate the array of strain sensors to measure the strain gradient over the area of the structure of the vehicle.

9. The system of claim 1, further comprising:
    a light source; and
    a light routing device connected to the light source, the strain-sensing apparatus, and the data acquisition system, wherein the light routing device is configured to send light from the light source to the strain-sensing apparatus and reflected light from the strain-sensing apparatus to the data acquisition system; and
    wherein the data acquisition system comprises an optical spectrum analyzer.

10. The system of claim 1, wherein the time of impact is based at least in part on a strain rate of a sensor of the array of strain sensors rising above a pre-determined threshold.

11. The system of claim 1, wherein the location of impact is based at least in part on changes in impact strain distribution of the array of strain sensor.

12. The system of claim 8, wherein the location of impact is based on a center of strain calculation using the post-impact strain distribution of the array of strain sensors.

13. The system of claim 1, wherein the location of impact is based on trilateration of time differentials between peak strain measurements of the array of strain sensors.

14. The system of claim 1, wherein the severity of damage of the impact is based at least in part on a comparison of a post-impact strain distribution of the array of strain sensors to a pre impact strain distribution of the array of strain sensors.

15. The system of claim 1, wherein the vehicle is a spacecraft, and wherein the structure is a micrometeoroid and orbital debris (MMOD) shielding layer of the spacecraft.

16. A method for impact detection and characterization of a collision between a vehicle and a fragment, the method comprising:
    monitoring strain rate of an array of strain sensors of a strain-sensing apparatus attached to the vehicle, wherein the array of strain sensors is connected via one or more optical fibers and configured to measure a strain gradient over an area of a structure of the vehicle caused by a transient shock load of the fragment; and
    determining, via a data acquisition system connected to the strain-sensing apparatus, a time of an impact, a location of the impact, and a severity of damage of the impact of the fragment on the area of the structure based, at least part, on a trilateration of post-impact residual strain rates of the strain gradient in the structure as measured by the strain sensors.

17. The method of claim 16, wherein the time of impact is based at least in part on at least one of the strain rates rising above a pre-determined threshold.

18. The method of claim 17, wherein the location of impact is based at least in part on a post-impact strain distribution of the array of strain sensors.

19. The method of claim 18, wherein the location of impact is based on a center of strain calculation using the post-impact strain distribution of the array of strain sensors.

20. The method of claim 17, wherein the severity of damage of the impact is based at least in part on a comparison of the post-impact strain distribution of the array of strain sensors to a pre-impact strain distribution of the array of strain sensors.

* * * * *